(12) United States Patent
Highsmith

(10) Patent No.: US 7,393,585 B2
(45) Date of Patent: Jul. 1, 2008

(54) MICRON-SIZE POLYMER PARTICLES COMPRISING POLYAMIDE COMPOUND, PRODUCTION AND USES THEREOF

(75) Inventor: Ronald Highsmith, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 10/684,856

(22) Filed: Oct. 13, 2003

(65) Prior Publication Data

US 2005/0079350 A1    Apr. 14, 2005

(51) Int. Cl.
    *B32B 5/16*    (2006.01)

(52) U.S. Cl. .................. 428/402; 428/474.4; 428/474.9

(58) Field of Classification Search .................. 428/402, 428/407; 524/538, 789; 423/402, 474.4, 423/474.9
    See application file for complete search history.

(56) References Cited

U.S. PATENT DOCUMENTS

| | | | | |
|---|---|---|---|---|
| 4,357,268 A | * | 11/1982 | Vanderkooi et al. | 524/285 |
| 4,387,184 A | * | 6/1983 | Coquard et al. | 525/183 |
| 4,726,989 A | * | 2/1988 | Mrozinski | 428/315.5 |
| 4,894,411 A | * | 1/1990 | Okada et al. | 524/710 |
| 5,139,760 A | * | 8/1992 | Ogawa et al. | 423/328.1 |
| 5,268,219 A | * | 12/1993 | Harada et al. | 428/220 |
| 5,344,673 A | * | 9/1994 | Hotta et al. | 427/195 |
| 5,407,985 A | * | 4/1995 | Smith | 524/238 |
| 5,886,087 A | * | 3/1999 | Dalla Torre | 524/538 |
| 6,022,613 A | * | 2/2000 | Ren | 428/220 |
| 6,107,444 A | * | 8/2000 | Bruneau et al. | 528/272 |
| 6,127,513 A | * | 10/2000 | Ohara et al. | 528/320 |
| 6,166,791 A | * | 12/2000 | Mitsui et al. | 349/112 |
| 6,723,443 B2 | * | 4/2004 | Tsai et al. | 428/475.5 |

OTHER PUBLICATIONS

Zeus online catalog, "Nylon Resin Family Properties".*
Zeus online catalog, "Nylon Resin Family Properties", 2005.*

* cited by examiner

*Primary Examiner*—H. Thi Le
(74) *Attorney, Agent, or Firm*—Sandra P. Thompson; Buchalter Nemer

(57) ABSTRACT

A plurality of micron-size solid particles is described herein that includes at least one polyamide compound, wherein the particles comprise a diameter in the range of about 1 micron to about 1000 microns, and wherein at least some of the plurality of particles are substantially transparent. In addition, a plurality of micron-size solid particles is described herein that includes at least one polyamide compound, wherein the particles comprise a diameter of less than about 4 microns. Methods of forming a plurality of micron-size solid particles are also described that include a) introducing at least one amide-based compound having a melting point, at least one suspending agent and at least one surfactant into a reaction vessel to form a reaction mixture; b) applying a thermal energy to the reaction mixture, wherein the thermal energy comprises a temperature that is at or above the melting point of the at least one amide-based compound; c) polymerizing the at least one amide-based compound in the reaction mixture; d) cooling the reaction mixture; and e) rinsing the reaction mixture to retrieve the polymer particles.

10 Claims, 2 Drawing Sheets

MICRON-SIZE POLYMER PARTICLES COMPRISING POLYAMIDE COMPOUND, PRODUCTION AND USES THEREOF

FIELD OF THE INVENTION

The field of the invention relates generally to solid micron-size polymer particles and particularly to micron-sized solid polyamide particles, production and uses thereof.

BACKGROUND

Micron size polymer particles are conventionally used in inks, filtration systems, nano-applications, nebulizers, spraying systems, powder coatings of metal and/or other objects and other devices and applications, such as separation chemistry and related analytical methods. Based on the wide variety of applications of these particles, it is important to produce them out of materials and compounds that are readily available, easy to produce and/or manufacture, and cost-efficient to the manufacturer.

In conventional particle production, several different types of polymers may be used, such as melamine resins, fluorescently-labeled polymers, carboxylate-modified polymers, latex, polystyrene-based polymers and polyvinyltoluene-based compounds; however, difficulties arise with respect to preparation of some particles, such as requirements for unusual materials and unusual techniques like cryogenic grinding. Polyamide polymers would be an ideal material to use to form micron-sized polymer particles, but difficulties arise especially when using these materials to produce the polymer particles, such as the requirement for unconventional solvents and as mentioned cryogenic grinding.

EP 733474 describes sealable polyolefin laminated films that may contain particulate hollow bodies or vacuoles. These hollow bodies are defined as "essentially closed polymer skin sheathes" having "an inner gas- or air-filled volume". Furthermore, these hollow bodies are formed in situ after vacuole-initiating particles are placed in contemplated films. The hollow bodies are not formed independently of the film or matrix that they are to be incorporated in to form the product. Formation of the hollow bodies in the film protects the hollow bodies from destruction and/or damage. Also, the hollow bodies are formed in the film to provide an opaque or "mother of pearl" quality to the film.

To this end, it would be useful to prepare and/or produce micron-sized solid polymer particles a) by using conventional and widely available solvents and conventional methods; b) that comprise nylon-type materials, given that nylon is a conventional and readily available material; c) that can be either opaque and transparent polymer particles; d) that can be readily formed independently of the final film or coating that the particles may be utilized in for other applications; and e) that can be reliably produced in a relatively narrow distribution of polymer particle diameters.

SUMMARY OF THE INVENTION

The subject matter herein is directed to a plurality of micron-size solid particles, comprising at least one polyamide compound, wherein the particles comprise a diameter in the range of about 1 micron to about 1000 microns, and wherein at least some of the plurality of particles are substantially transparent.

The subject matter herein is also directed to a plurality of micron-size solid particles, comprising at least one polyamide compound, wherein the particles comprise a diameter of less than about 4 microns.

The subject matter herein is additionally directed to a method of forming a plurality of micron-size solid particles that includes a) introducing at least one amide-based compound having a melting point, at least one suspending agent and at least one surfactant into a reaction vessel to form a reaction mixture; b) applying a thermal energy to the reaction mixture, wherein the thermal energy comprises a temperature that is at or above the melting point of the at least one amide-based compound; c) polymerizing the at least one amide-based compound in the reaction mixture; d) cooling the reaction mixture; and e) rinsing the reaction mixture to retrieve the polymer particles.

DETAILED DESCRIPTION

Figure 1A:
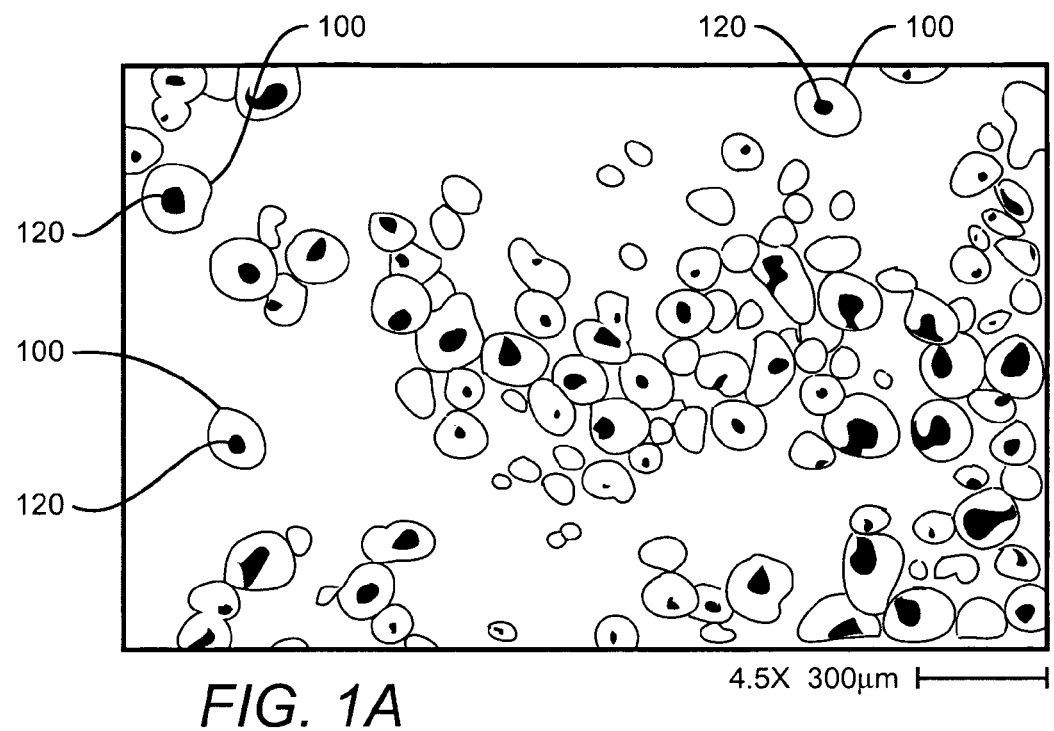
FIG. 1A shows a graphic representation of a contemplated embodiment.

Polymers using amide monomers could be considered an ideal material to use to form micron-sized polymer particles, but difficulties arise especially when using these materials to produce polymer particles, such as the requirement for unconventional solvents, support matrices and as mentioned earlier, cryogenic grinding. Based on these difficulties, methods have now been developed, which are disclosed herein that address many of those difficulties. A method of forming a plurality of micron-size solid particles includes a) introducing at least one amide-based compound having a melting point, at least one suspending agent and at least one surfactant into a reaction vessel to form a reaction mixture; b) applying a thermal energy to the reaction mixture, wherein the thermal energy comprises a temperature that is at or above the melting point of the at least one amide-based compound; c) polymerizing the at least one amide-based compound in the reaction mixture; d) cooling the reaction mixture; and e) rinsing the reaction mixture to retrieve the polymer particles. In some embodiments, an activating agent may be added at any point before or during the polymerization step to facilitate the initiation or propagation of the polymerization process.

As described herein, a plurality of micron-size particles can be formed that comprise at least one polyamide compound, wherein the particles comprise a diameter in a range of about 1 micron (micrometer) to about 1000 microns (micrometers) and wherein at least some of the particles are substantially transparent or, in some embodiments, wherein the particles may or may not be transparent and comprise a diameter of less than about 4 microns. As used herein, the term "compound" means a substance with constant composition that can be broken down into elements by chemical processes. Polyamides, as the name implies, are polymers that comprise amide monomers. Amides are an important group of nitrogenous compounds and monomers that are used as intermediates and/or building blocks in the production of polymers, textiles, plastics and adhesives. Amide monomers are generally represented by the following formula:

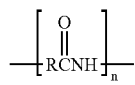

wherein R is an alkyl group, an aryl group, a cyclic alkyl group, an alkenyl group, an arylalkylene group, or any other appropriate group that can be utilized to be a part of an amide compound.

As used herein, the term "monomer" generally refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers". The weight-average molecular weight of monomers may vary greatly between about 40 Dalton and 20000 Dalton. However, especially when monomers comprise repetitive building blocks, monomers may have even higher molecular weights. Monomers may also include additional groups, such as groups used for crosslinking, radiolabeling, and/or chemical or environmental protecting.

The term "alkyl" is used herein to mean a branched or a straight-chain saturated hydrocarbon group or substituent of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. In some embodiments, contemplated alkyl groups contain 1 to 12 carbon atoms. The term "cyclic alkyl" means an alkyl compound whose structure is characterized by one or more closed rings. The cyclic alkyl may be mono-, bi-, tri- or polycyclic depending on the number of rings present in the compound.

The term "aryl" is used herein to mean a monocyclic aromatic species of 5 to 7 carbon atoms or a compound that is built with monocyclic aromatic species of 5 to 7 carbon atoms and is typically phenyl, naphthalyl, phenanthryl, anthracyl etc. Optionally, these groups are substituted with one to four, more preferably one to two alkyl, alkoxy, hydroxy, and/or nitro substituents.

The term "alkenyl" is used herein to mean a branched or a straight-chain hydrocarbon chain containing from 2 to 24 carbon atoms and at least one double bond. Preferred alkenyl groups herein contain 1 to 12 carbon atoms.

The term "alkoxy" is used herein to mean an alkyl group bound through a single, terminal ether linkage; that is, an alkoxy group may be defined as —OR wherein R is an alkyl group, as defined above.

The term "arylalkylene" is used herein to mean moieties containing both alkylene and monocyclic aryl species, typically containing less than about 12 carbon atoms in the alkylene portion, and wherein the aryl substituent is bonded to the structure of interest through an alkylene linking group. Exemplary arylalkylene groups have the structure —(CH$_2$)$_j$—Ar wherein "j" is an integer in the range of 1 to 6 and wherein "Ar" is an aryl species.

At least one amide-based compound or amide-based monomer having a melting point is introduced along with at least one suspending agent (or suspension agent) and at least one surfactant into a reaction vessel to form a reaction mixture. Amide-based compounds and/or amide-based monomers can also be straight-chain, branched, substituted and cyclic. Cyclic amides are often referred to as "lactams", which are produced from amino acids by the removal of one molecule of water. Exemplary amides include acetamides, acrylamides, anilides, benzamides, benzoylarginine-2-naphthylamide, formamides, lactams, salicylamides, sulfonamides and thioamides. An example of a cyclic amide is a lactam, such as caprolactam or ε-caprolactam. In contemplated embodiments, the at least one amide-based compound or amide-based monomer comprises a lactam or caprolactam. In other contemplated embodiments, the at least one amide-based compound, amide-based monomer or polyamide composition comprises a nylon compound, such as nylon 6, nylon 66 and/or nylon-6/66, which is a copolymer of nylon-6 and nylon 66 and can itself be used as a monomer. As used herein, the phrase "melting point" means that temperature at which the solid amide-based compound is in equilibrium with the liquid phase of the amide-based compound at atmospheric pressure. Each amide-based compound and/or amide-based monomer comprises a specific melting point that is influenced by purity, molecule size and branching, crosslinking etc.

ε-Caprolactam, also known as aminocaproic lactam and 2-oxohexamethyleneimine, is a compound that is produced in flake and molten forms and is used primarily in the manufacture of Nylon-6 products such as synthetic fibers, plastics, bristles, films, coatings, synthetic leathers, plasticizers and paint vehicles. Caprolactam can also be used as a cross-linking agent for polyurethanes and in the synthesis of the amino acid lysine.

Amides, such as caprolactam, are generally produced by reacting a ketone with hydroxylamine to make an oxime, and then using an acid catalyzed rearrangement of the oxime(s), conventionally called the Beckmann rearrangement, to form the amide. Two examples of the Beckmann rearrangement process are shown below:

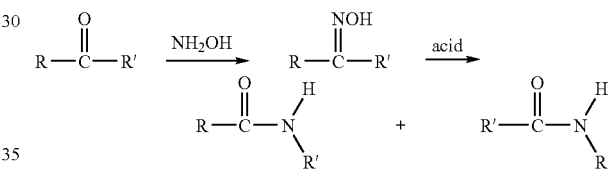

EXAMPLE 1

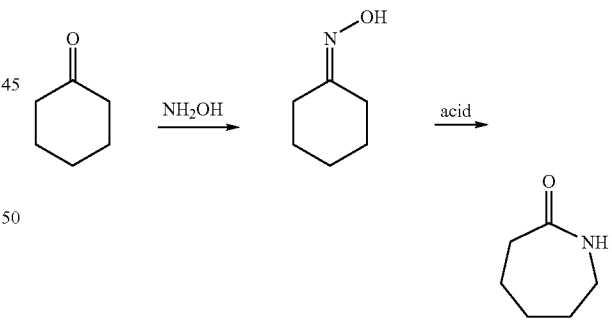

EXAMPLE 2

Merchant quality caprolactam can be produced by methods described in U.S. patent application Ser. No. 10/251,335 filed on Sep. 21, 2002, which is commonly owned and herein incorporated in its entirety.

In addition to the at least one amide-based compound or amide-based monomer, at least one suspending agent (or suspension agent) is introduced into the reaction vessel. Contemplated suspending agents include any suitable pure or mixture of molecules that can be used in preparing an emulsion, while at the same time being poor solvents for the polar amide-based compounds or amide-based monomers. It has been discovered that if the suspending agent is a good solvent for the amide-based compound or amide-based monomer that, upon initiation of polymerization, the product tends to form a monolithic piece of polymer and/or a film on the walls of the reactor.

The suspending agent may also comprise any suitable pure or mixture of polar and non-polar compounds, as long as the suspending agent meets the conditions described above, i.e. is a poor solvent for the amide-based compounds or amide-based monomers. As used herein, the term "pure" means is composed of a single molecule or compound. For example, pure water is composed solely of $H_2O$. As used herein, the term "mixture" means that component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

In some contemplated embodiments, the suspending agent or suspending agent mixture (comprising at least two suspending agents) comprise those suspending agents that are considered part of the hydrocarbon family of solvents. Hydrocarbon solvents are those solvents that comprise carbon and hydrogen. It should be understood that a majority of hydrocarbon solvents are non-polar; however, there are a few hydrocarbon solvents that could be considered polar. Hydrocarbon solvents are generally broken down into three classes: aliphatic, cyclic and aromatic. Aliphatic hydrocarbon solvents may comprise both straight-chain compounds and compounds that are branched and possibly crosslinked, however, aliphatic hydrocarbon solvents are not considered cyclic. Cyclic hydrocarbon solvents are those solvents that comprise at least three carbon atoms oriented in a ring structure with properties similar to aliphatic hydrocarbon solvents. Aromatic hydrocarbon solvents are those solvents that comprise generally three or more unsaturated bonds with a single ring or multiple rings attached by a common bond and/or multiple rings fused together. Contemplated suspending agents include toluene, xylene, p-xylene, m-xylene, mesitylene, solvent naphtha H, solvent naphtha A, alkanes, such as pentane, hexane, isohexane, heptane, nonane, octane, dodecane, 2-methylbutane, hexadecane, tridecane, pentadecane, cyclopentane, 2,2,4-trimethylpentane, petroleum ethers, halogenated hydrocarbons, such as chlorinated hydrocarbons, nitrated hydrocarbons, benzene, 1,2-dimethylbenzene, 1,2,4-trimethylbenzene, mineral spirits, kerosine, isobutylbenzene, methylnaphthalene, ethyltoluene, ligroine. Particularly contemplated suspending agents include, but are not limited to, pentane, hexane, heptane, cyclohexane, benzene, toluene, xylene and mixtures or combinations thereof. In other contemplated embodiments, branched hydrocarbons are utilized as suspending agents, because they are in liquid form at a higher molecular weight and consequently have higher flash points. One example of a contemplated branched hydrocarbon suspending agent is the class of Isopar solvents (Exxon), and more specifically Isopar M and Isopar G. Another example of a suitable suspending agent is the Soltrol class of solvents made by Phillips 66, such as Soltrol 170 and Soltrol 220.

At least one surfactant is also added to the reaction mixture comprising the at least one amide-based compound and/or amide-based monomer and the at least one suspending agent. As used herein, the term "surfactant" means any compound that reduces surface tension when dissolved in water or water solutions, or which reduces interfacial tension between two liquids or between a liquid and a solid. In contemplated embodiments, the surfactant is an emulsifier, as opposed to a detergent or a wetting agent—which are other known classes of surfactants. Contemplated surfactants comprise ICI's Hypermer LP-1, Adogen 477, Tergitol 15-S-12, Tergitol XJ, Tergitol XH, Tergitol XD, Igepal RC-630, Igepal DM-430, Igepal CA-420, Rhodameen PN-430, Antarox L61, Mazeen DBA1, Synperonic PE/85, Synperonic PE/L35, Synperonic PE/P75, Synperonic PE/F108, Synperonic PE/F68, Synperonic PE/F87, Synperonic PE/F88, Synperonic PE/F127, Synperonic PE/L61, Hypermer 2630, Span 60, Zephryn PD2678, Zephryn PD2206, Atlox 4912, Aldo HMS, Aldosperse TS40 or combinations thereof. More contemplated surfactants comprise ICI's Hypermer LP-1, Atlox 4912 or combinations thereof.

The reaction mixture comprising the at least one amide-based compound and/or amide-based monomer having a melting point, the at least one suspending agent and the at least one surfactant can be formed in any suitable reaction vessel or on any suitable surface. It is contemplated that a suitable reaction vessel is one that is accessible to the operator and relatively cost efficient. A suitable vessel includes a petri dish, a beaker, an Erlenmeyer flask, a graduated cylinder, a vat, or a test tube. It is also contemplated that a suitable reaction vessel may comprise any appropriate material, such as glass, ceramic, inert material or metal. It is contemplated that a suitable surface may be flat, curved, rough, smooth, solid, liquid, or gas. It is also contemplated that a suitable surface may comprise any appropriate material, such as glass, ceramic, metal, water, ice, or steam.

During or after the formation of the reaction mixture, a thermal energy may be applied to the reaction mixture, wherein the thermal energy comprises a temperature that is at or above the melting point of the at least one amide-based compound and/or amide-based monomer. The thermal energy may come from any suitable source, including point sources, such as lasers; extended/non-point sources, such as a UV-VIS source, an infra-red source, a heat source, both radiative and convective, or a microwave source; or electron sources, such as electron guns or plasma sources. Other suitable energy sources include electron beams, and radiative devices at non-IR wavelengths including x-ray, and gamma ray. Still other suitable energy sources include vibrational sources such as microwave transmitters. In contemplated embodiments, the energy source is an extended source. In other contemplated embodiments, the energy source is a heat source, such as a hot plate or a Bunsen burner.

It should be understood that the thermal energy may be applied consistently or in short bursts. It is also contemplated that the thermal energy may be gradually and continuously applied over a temperature range until the thermal energy is at or above the melting point of the at least one amide compound and/or amide monomer. For example, once the components are introduced into the reaction vessel, the thermal energy may come from a heat source that starts out at 0° C. and rises 5° C./minute until it reaches the melting point of the at least one amide-based compound and/or amide-based monomer, and then the heat source holds that temperature for a period of time, such as 10 minutes. The thermal energy may also be immediately applied at or above the melting point of the at least one amide-based compound and/or amide-based monomer without any ramp time.

In some embodiments, the reaction mixture is made to be substantially free of moisture before the thermal energy is applied. This reduction in the amount of moisture can be achieved by any suitable method, such as partial distillation of the at least one solvent or by drying the solvent and/or reaction mixture over conventional drying compounds.

Once the reaction mixture is formed and thermal energy is applied, the at least one amide-based compound and/or monomer is polymerized. The polymerization process generally starts by vigorously stirring or agitating the reaction mixture to form an emulsion. Thereafter, the polymerization process can take place using any suitable and appropriate polymerization methods, such as anionic polymerization, free radical emulsion polymerization, free radical solution polymerization, oxidation/reduction polymerization, cationic polymerization or any combination thereof. In contemplated embodiments, the polymerization process takes place by using anionic polymerization.

In addition, at least one alkylating/condensing agent and/or at least one activator may be introduced into the reaction mixture. The at least one alkylating/condensing agent and/or at least one activator is added to facilitate the initiation or the propagation of the polymerization process. The class of isocyanate-based compounds are considered contemplated and useful activators. In some contemplated embodiments, the alkylating agent comprises sodium hydride and the activator comprises a polyisocyanate, such as Desmodur M. The at least one alkylating agent and at least one activator may be added at one time, may be added in a step-wise fashion or may be added in a combination thereof. The at least one alkylating agent and/or at least one activator may also be added before or during the polymerization step. In some embodiments, the at least one alkylating agent and/or at least one activator may be added along with the at least one amide-based compound and/or amide-based monomer having a melting point, the at least one suspending agent and the at least one surfactant and may become active only after the application of thermal energy or agitation.

Once the polymerization process has been completed or is nearly complete the emulsion is allowed to rest. It is at this point that if cooling is needed, the reaction mixture can be cooled. The cooling step can take place by merely letting the reaction mixture cool naturally to room or environmental temperature, or the cooling step can be accelerated by using a cooling apparatus, such as an ice water bath, liquid nitrogen or dry ice. In some embodiments, there may be no need to allow the reaction mixture to cool, especially if the melting point of the at least one amide is relatively low.

The reaction mixture is then rinsed with a suitable solution or solvent, such as water, in order to recover the polymer particles from the reaction mixture. The plurality of polymer particles that are substantially transparent comprises a diameter in the range of about 1 micron to about 1000 microns The plurality of polymer particles that may or may not be substantially transparent, such as those described herein, comprise a diameter of less than about 4 microns, and in contemplated embodiments, at least some of the plurality of particles comprises a diameter of less than about 2 microns. It is further contemplated that the plurality of polymer particles comprises two or more different diameters.

At this point it should be understood that, unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

Additionally, there are embodiments wherein some or all of the particles are substantially transparent. In some embodiments, at least about 40% of the particles are substantially transparent, at least about 60% of the particles are substantially transparent or at least 80% of the particles are substantially transparent. As used herein, the term "substantially" when applied to the term "transparent" means that the particle is transparent enough such that there is at least a 60% transmittance of light through the particle, as measured on any conventional spectrophotometer or spectrophotometric apparatus.

The plurality of polymer particles, especially the transparent particles, may optionally require that at least one inert nucleating particle be utilized to start the polymer particle formation. It should be understood however that in contemplated embodiments, the plurality of nucleating particles utilized in the formation of the polymer particles needs to have as narrow of a size/diameter distribution as experimentally possible. The narrow distribution of inert particle size is ideal in order to achieve a narrow distribution of polymer particle diameter in the plurality of polymer particles.

The nucleating particle may be any chemically inert substance, such as particles that comprise carbon, diamond, antimony, aluminum, boron, calcium, cerium, chromium, copper, gadolinium, germanium, hafnium, indium, iron, lanthanum, lead, magnesium, manganese, neodymium, nickel, scandium, silicon, terbium, tin, titanium, tungsten, vanadium, yttrium, zinc, zirconium or a combination thereof. In contemplated embodiments, the inert nucleating particle comprises alumina-silicate.

Figure 1B:
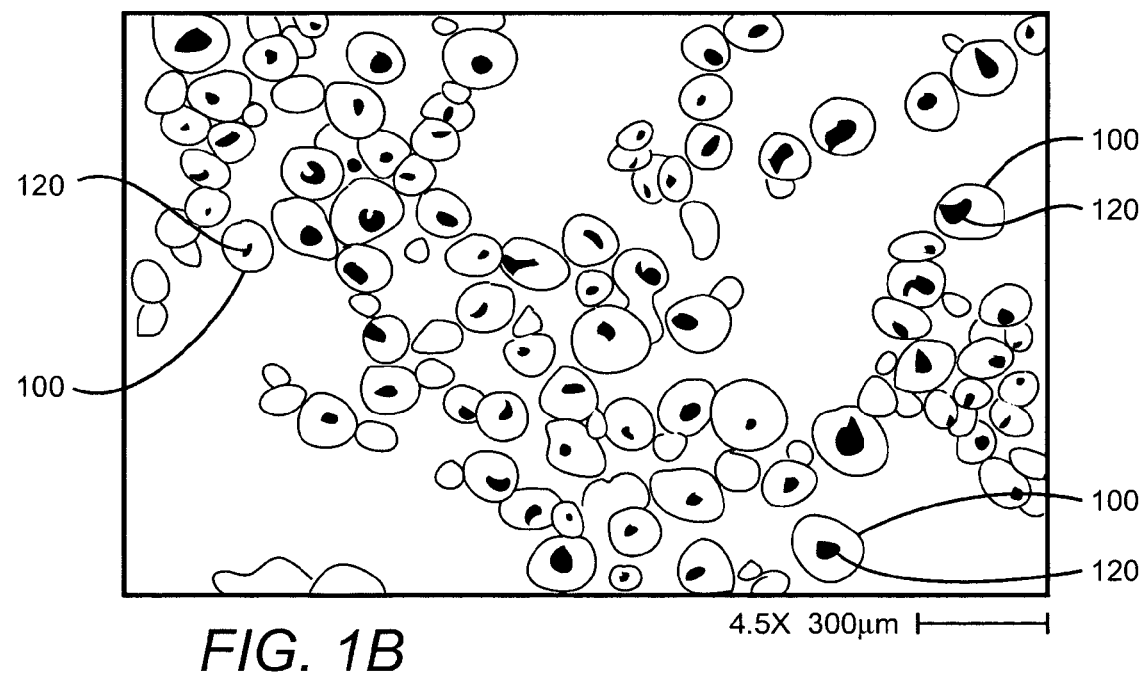
FIG. 1B shows a graphic representation of a contemplated embodiment.
Figure 2A:
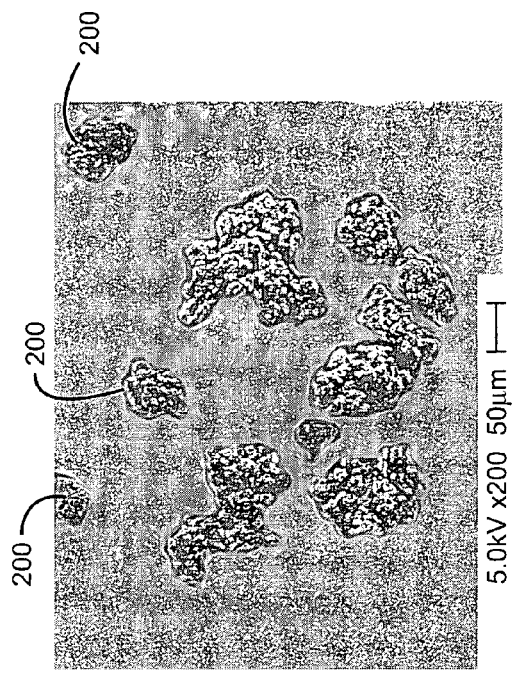
FIG. 2A shows a graphic representation of a contemplated embodiment on a 100 micrometer scale.
Figure 2B:
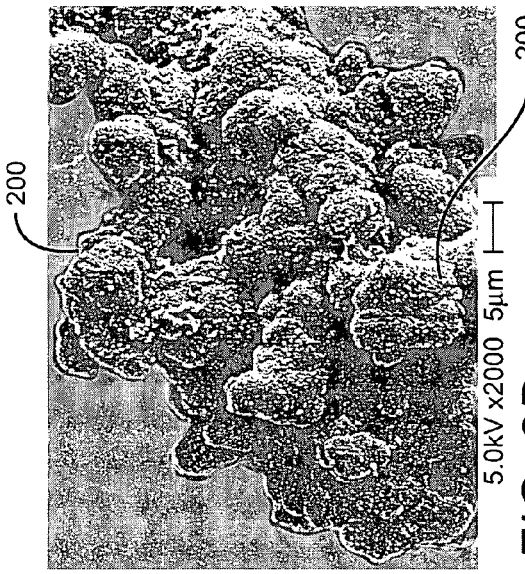
FIG. 2B shows a graphic representation of a contemplated embodiment on a 50 micrometer scale.
Figure 2C:
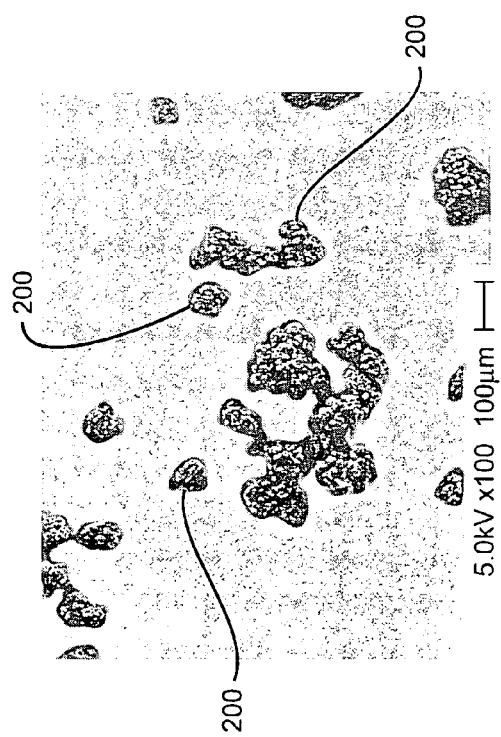
FIG. 2C shows a graphic representation of a contemplated embodiment on a 50 micrometer scale.
Figure 2D:
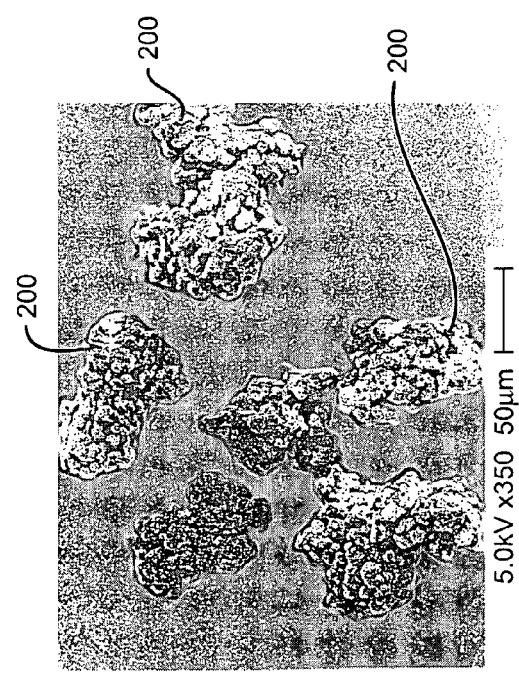
FIG. 2D shows a graphic representation of a contemplated embodiment on a 5 micrometer scale.

In other embodiments, the nucleating particle may comprise at least one color pigment. As used herein, the term "pigment" means any substance, usually in the form of a dry powder, that imparts color to another substance or mixture or that has a positive colorant value. Pigments may comprise any suitable inorganic or organic material, such as metal oxides, metal powder suspensions, earth colors, lead chromates, carbon black, animal pigments and vegetable pigments. Contemplated pigments reside substantially in the interior of the micron-size solid particle and thereby imparts color to the entire particle and not just to the surface of the particle. FIGS. 1A and 1B show graphic reproductions of photographs taken of micron-size nylon particles 100 comprising a color pigment 120 and/or inert particle material 120. From the figures, it is clear that the diameter of each of the particles is less than about 300 microns. The Experimental conditions used to form the particles in FIGS. 1A and 1B are described in the Examples Section.

As used herein, the term "metal" means those elements that are in the d-block and f-block of the Periodic Chart of the Elements, along with those elements that have metal-like properties, such as silicon and germanium. As used herein, the phrase "d-block" means those elements that have electrons filling the 3d, 4d, 5d, and 6d orbitals surrounding the nucleus of the element. As used herein, the phrase "f-block"

means those elements that have electrons filling the 4f and 5f orbitals surrounding the nucleus of the element, including the lanthanides and the actinides. Preferred metals include indium, silver, copper, aluminum, tin, bismuth, gallium and alloys thereof, silver coated copper, and silver coated aluminum. The term "metal" also includes alloys, metal/metal composites, metal ceramic composites, metal polymer composites, as well as other metal composites.

Micron-size solid particles described herein may be used in any number of suitable applications, as described earlier, including inks, filtration systems, nano-applications, nebulizers, spraying systems, and as powder coatings for metals and m etal alloys, which depend heavily on uniform size, small (less than about 4 microns) particles.

EXAMPLES

Example 1

A 1 liter flask is provided for this Example. Insert a nitrogen gas flush inside the vessel so that the nitrogen gas bubbles through the liquid. Note: be sure that there is a stopcock in the vacuum line between the pump and the vessel. A manometer should be hooked into the line between the vessel and the stopcock so that the pressure in the vessel can be monitored when the stopcock is closed. The glass nitrogen line into the vessel should have a stopcock, so that the vacuum can be applied to the vessel without removal of the nitrogen line.

About 700 mL (545 g) of Isopar M (bp=225° C.) was added to the flask and stirring began. About 270 g of caprolactam, about 10.85 g Atlox 4912 and about 5.35 g PE/85 was added to the stirring solution. The vacuum was set at about 100 mm (26 inches). The vacuum may also be adjusted up to about 29 inches. Heating was applied and distillation began between about 100 and 110° C. After about 60 mL distilled over, the stopcock was shut in the vacuum line and nitrogen gas was slowly introduced until the manometer reached atmospheric pressure. Bubbled nitrogen continued through the liquid and out the top of the vessel. Stirring also was continued.

The liquid was allowed to cool to about 71° C. (just above the melting point of caprolactam). About 2 g of sodium hydride was added to the vessel. Stirring was continued for 10 minutes and then about 8 g of isocyanate (in this case, Desmodur) was slowly added over the next 35 minutes. The liquid was continuously stirred and the temperature was slowly raised to 100° C. over a period of about an hour. The liquid was then held at that temperature for another hour. About 4 g of isocyanate was slowly added while slowly raising the temperature to about 130° C. over a period of about an hour. The liquid was held at about 135° C. for another hour, while nitrogen was continuously bubbled through the liquid. The heat was shut off and the liquid was allowed to cool. The nitrogen kept bubbling until the temperature dropped to about 80° C. Loose particles consisting of nylon were produced that ranged in diameter of about 3 microns and above.

Example 2

An ACE thread tube was loaded with about 7.5 grams of caprolactam and about 3 grams of Isopar M (bp=225° C.) and about 1 gram of LP-1 surfactant. About 0.1 gram of NaH was placed in a side arm that was pointed down. Vacuum (nearly 30 inches) was applied and the tube was heated up to about 110° C. to azeotropically dry the lactam. About 1 to 1.5 hours was required. The tube was allowed to cool and nitrogen was used to fill the tube. Then about 20 mL of pentane that had been stored over NaH was added. Vacuum was applied briefly 3 times to remove the gas in order to keep internal pressure solely the result of vapor pressure.

The temperature was brought to about 80° C. and the tube tilted to bring the liquid into the side arm in order to make contact between the liquid and the NaH. The mixture was allowed at about 80° C. to continue for about an hour when the tube was opened again after cooling in order to add about 2.5 g hexamethyldiisocyanate. The mixture was then subjected to about 90° C. followed by a shorter exposure at about 114° C. Upon cool down, the tube was opened and the contents were poured into a pan of water. No unreacted NaH was evident. The volume (about 230 mL) was poured into a 250 mL graduated cylinder and left to sit overnight. The scum that formed on top was separated and examined by a microscope—it looked like emulsion-in-emulsion. The main liquid (about 200 mL) was opaque with a solid residue in the bottom. The liquid was decanted and centrifuged. A small portion of the residue in the centrifuge tube was examined by a microscope and then dried at 90° C. and washed with acetone. The result was solid particles.

A larger sample was dried and washed with acetone. The acetone was evaporated and the result was a sticky solid that was probably oligomers and LP-1. The residue from the bottom of the graduated cylinder and the residue from the bottom of the 3 centrifuge tubes was combined and filtered on a 55 mm Whatman #42 filter very slowly. The retained solids were washed with DI water followed by acetone, ground in a mortar and pestle and sieved. Microscopic examination of the fractions showed that all were identical except for overall size: the large pieces were agglomerates of very small particles (mostly spherical). Many individual particles were also observed.

Example 3

A 1 liter flask with a bottom outlet is provided for this Example and is attached to a homogenizer. Insert a nitrogen gas flush inside the vessel so that the nitrogen gas bubbles through the liquid. There was nitrogen pressure on the reactor so that when the stopper was removed the nitrogen flows out and the air cannot get into the flask.

About 700 mL (513 g) of Isopar G (bp=225° C.) was added to the flask and stirring began. About 270 g of caprolactam, about 1.2 g of Zeolex 80 and about 30 grams of Atlox 4912 was added to the stirring solution. Nitrogen was bubbled through the solution, while heating was begun. The heaters for the homogenizer lines were turned on. The homogenizer was turned on when the lactam had melted.

The nitrogen was shut off, the vacuum was set at about 250 mm (10 inches) and the temperature was gradually raised until distillation began. If the temperature at which distillation starts is below 100° C., the temperature should be reduced quickly and the vacuum reduced to about 9 inches. Then start heating again. It is desirable that about 60 mL of Isopar be distilled at temperatures of above about 100° C.

The evaporated material was collected in a trap marked to show 60 mL of Isopar. Bubbling and homogenization was continued, as well as stirring, as the reactor is allowed to cool down to about 72° C. The homogenizer was turned off and the valves were also turned off.

About 2 g of sodium hydride was added to the reactor. The nitrogen flush should be forcing nitrogen gas out of the opening of the reactor. The reactor was stoppered. A pump was set up so that a solution of about 12 g of hexamethyldiisocyanate in about 108 mL of Isopar G is added at about 1 mL/min. The solution is purged with nitrogen thoroughly and sealed to avoid air contact with the solution. The solution is then pumped while raising the temperature from about 72° C. to about 130° C. at a rate of about 5° C. per every 10 minutes. The reactor was allowed to cool while maintaining the nitrogen flow. At this point, the stirrer may be shut off.

The resulting particles were washed twice with hot water, filtered twice, washed twice with acetone, air dried at room temperature and then in an oven set at about 67° C.

Example 4

A 1 liter flask with a bottom outlet is provided for this Example and is attached to a homogenizer. Insert a nitrogen gas flush inside the vessel so that the nitrogen gas bubbles through the liquid. There was nitrogen pressure on the reactor so that when the stopper was removed the nitrogen flows out and the air cannot get into the flask.

About 700 mL (513 g) of Isopar G (bp=225° C.) was added to the flask and stirring began. About 270 g of caprolactam, about 1.2 g of Zeolex 80 and about 30 grams of Atlox 4912 was added to the stirring solution. Nitrogen was bubbled vigorously through the solution, while heating was begun. The heaters for the homogenizer lines were turned on. The homogenizer was turned on when the lactam had melted (not over about 80° C.) and the mixture was homogenized for about 10 minutes.

The nitrogen was continued while gradually raising the temperature to about 110° C. If liquid collected at the end of the condenser, the rate of nitrogen was reduced to about 1 bubble per minute when about 60 mL Isopar had been collected. Otherwise, the nitrogen was cut back after about 20 minutes at 110° C. The reactor is allowed to cool down to about 72° C. The homogenizer was turned off and the valves were also turned off.

About 2 g of sodium hydride was added to the reactor. The nitrogen flush should be forcing nitrogen gas out of the opening of the reactor. The reactor was stoppered. A pump was set up so that a solution of about 12 g of hexamethyldiisocyanate in about 108 mL of Isopar G is added at about 1 mL/min. The solution is purged with nitrogen thoroughly and sealed to avoid air contact with the solution. The solution is then pumped while raising the temperature from about 72° C. to about 130° C. at a rate of about 5° C. per every 10 minutes. The reactor was kept at a temperature of 110° C. overnight, while maintaining the nitrogen flow and the stirrer.

The resulting particles were washed twice with hot water, filtered twice, washed twice with acetone, air dried at room temperature and then in an oven set at about 67° C. FIGS. 2A-2D show graphical representations of scanning electron microscope results collected from the resulting particles 200. Note: the scale at the bottom of each Figure.

Example 5

A 1 liter flask with a bottom outlet is provided for this Example and is attached to a homogenizer. Insert a nitrogen gas flush inside the vessel so that the nitrogen gas bubbles through the liquid. There was nitrogen pressure on the reactor so that when the stopper was removed the nitrogen flows out and the air cannot get into the flask.

About 700 mL (513 g) of Isopar G (bp=225° C.) was added to the flask and stirring began. About 216 g of caprolactam, about 54 g of laurel lactam, about 2.4 g Zeolex 80 and about 30 grams of Atlox 4912 was added to the stirring solution. Nitrogen was bubbled vigorously through the solution, while heating was begun. The heaters for the homogenizer lines were turned on. The homogenizer was turned on when the lactam had melted (not over about 80° C.) and the mixture was homogenized for about 10 minutes. The homogenizer lines should also be at about 80° C.

The nitrogen was continued while gradually raising the temperature to about 110° C. If liquid collected at the end of the condenser, the rate of nitrogen was reduced to about 1 bubble per minute when about 60 mL Isopar had been collected. Otherwise, the nitrogen was cut back after about 20 minutes at 110° C. The reactor is allowed to cool down to about 72° C. The homogenizer was turned off and the valves were also turned off.

About 2 g of sodium hydride was added to the reactor. The nitrogen flush should be forcing nitrogen gas out of the opening of the reactor. The reactor was stoppered. A pump was set up so that a solution of about 12 g of hexamethyldiisocyanate in about 108 mL of Isopar G is added at about 1 mL/min. The solution is purged with nitrogen thoroughly and sealed to avoid air contact with the solution. The solution is then pumped while raising the temperature from about 72° C. to about 130° C. at a rate of about 5° C. per every 10 minutes. The reactor was kept at a temperature of 130° C. to about 140° C. for 30 minutes while maintaining nitrogen flow. Everything except the nitrogen was turned off and the reactor was allowed to cool.

The resulting particles were washed with hexane, washed twice with hot water, filtered twice, washed twice with acetone, air dried at room temperature and then in an oven set at about 67° C.

Example 6

A 1 liter flask with a bottom outlet is provided for this Example and is attached to a homogenizer. Insert a nitrogen gas flush inside the vessel so that the nitrogen gas bubbles through the liquid. There was nitrogen pressure on the reactor so that when the stopper was removed the nitrogen flows out and the air cannot get into the flask.

About 700 mL (513 g) of Isopar G (bp=225° C.) was added to the flask and stirring began. About 250 g of caprolactam, about 2.5 g of Irgalite Blue BSP (Ciba)—less than about 1 micron in size, about 15 g LP-1 and about 15 grams of Atlox 4912 was added to the stirring solution. Nitrogen was bubbled vigorously through the solution, while heating was begun. The heaters for the homogenizer lines were turned on. The homogenizer was turned on when the lactam had melted (not over about 80° C.) and the mixture was homogenized for about 10 minutes. The homogenizer lines should also be at about 80° C.

The nitrogen was continued while gradually raising the temperature to about 110° C. If liquid collected at the end of the condenser, the rate of nitrogen was reduced to about 1 bubble per minute when about 60 mL Isopar had been collected. Otherwise, the nitrogen was cut back after about 20 minutes at 110° C. The reactor is allowed to cool down to about 72° C. The homogenizer was turned off and the valves were also turned off.

About 2 g of sodium hydride was added to the reactor. The nitrogen flush should be forcing nitrogen gas out of the opening of the reactor. The reactor was stoppered. A pump was set up so that a solution of about 12 g of hexamethyldiisocyanate in about 108 mL of Isopar G is added at about 1 mL/min. The solution is purged with nitrogen thoroughly and sealed to avoid air contact with the solution. The solution is then pumped while raising the temperature from about 72° C. to about 130° C. at a rate of about 5° C. per every 10 minutes.

The reactor was kept at a temperature of 130° C. to about 140° C. for 30 minutes while maintaining nitrogen flow. Everything except the nitrogen was turned off and the reactor was allowed to cool.

The resulting particles were washed with cyclohexane first, then acetone, then water and then dried in an oven set at about 67° C. Powder consisted of agglomerates of very dark blue round balls and smaller particles which were white and light blue.

Thus, specific embodiments and applications of micron-size solid polymer particles, their production and uses thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A plurality of micron-size solid particles, comprising at least one polyamide compound, wherein the particles consist of a diameter of less than about 4 microns, wherein the at least one polyamide compound comprises a nylon compound, and wherein the solid particles are formed independently of a film or coating that the particles may be utilized in for other applications.

2. The plurality of particles of claim 1, wherein the at least one polyamide compound comprises a —CONH functional group.

3. The plurality of particles of claim 1, wherein the nylon compound comprises nylon 6.

4. The plurality of particles of claim 1, wherein the particles comprise a diameter of less than about 2 microns.

5. The plurality of particles of claim 1, wherein at least about 40% of the particles are substantially transparent.

6. The plurality of particles of claim 5, wherein at least about 60% of the particles are substantially transparent.

7. The plurality of particles of claim 6, wherein at least about 80% of the particles are substantially transparent.

8. The plurality of particles of claim 1, wherein at least some of the transparent particles comprise at least one inert nucleating particle.

9. The plurality of particles of claim 8, wherein the at least one inert particle comprises at least one alumina-silicate compound.

10. The plurality of particles of claim 8, wherein the at least one inert particle comprises at least one color pigment.

* * * * *